(12) United States Patent
DiMattia et al.

(10) Patent No.: US 10,367,874 B2
(45) Date of Patent: Jul. 30, 2019

(54) MPEG-DASH DELIVERY OVER MULTICAST

(71) Applicant: Verizon Patent and Licensing Inc., Arlington, VA (US)

(72) Inventors: James F. DiMattia, Easton, PA (US); Sankar Subramanian, Ossining, NY (US); Johannes P. Schmidt, Los Altos Hills, CA (US); Walter J. Schmidt, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 15/391,245

(22) Filed: Dec. 27, 2016

(65) Prior Publication Data

US 2018/0131742 A1 May 10, 2018

Related U.S. Application Data

(60) Provisional application No. 62/417,469, filed on Nov. 4, 2016.

(51) Int. Cl.
*H04L 29/06* (2006.01)
*H04L 29/08* (2006.01)

(52) U.S. Cl.
CPC ........ *H04L 65/607* (2013.01); *H04L 65/4076* (2013.01); *H04L 65/4084* (2013.01); *H04L 65/601* (2013.01); *H04L 67/02* (2013.01); *H04L 69/08* (2013.01)

(58) Field of Classification Search
CPC ... H04L 67/02; H04L 65/607; H04L 65/4076; H04L 65/4084; H04L 65/601; H04L 69/08
USPC .......................... 709/201, 217, 219, 230, 231
See application file for complete search history.

(56) References Cited

U.S. PATENT DOCUMENTS

2013/0091251 A1* 4/2013 Walker ............... H04N 21/6125
709/219
2016/0323348 A1* 11/2016 Bradbury ................ H04L 67/02

* cited by examiner

*Primary Examiner* — Chirag R Patel
*Assistant Examiner* — Marshall M McLeod

(57) ABSTRACT

A method, a system, and a non-transitory storage medium provides to receive a program including audio and video data; generate Moving Picture Experts Group (MPEG) Dynamic Adaptive Streaming over Hypertext Transfer Protocol (HTTP) (MPEG-DASH) segments that have multiple bit rates; transmit first packets that include the MPEG-DASH segments; divide each of the MPEG-DASH segments into first multiple slices of program data; generate a first header for each first slice of the first multiple slices, wherein the first header includes sequence information; multicast second packets that include first headers and the first multiple slices of each of the MPEG-DASH segments; assemble the MPEG-DASH segments; divide each of the MPEG-DASH segments into second multiple slices of the program data; encapsulate the second multiple slices into third packets; generate forward error correction packets; and multicast to a user device of a multicast, the third packets and the forward error correction packets.

20 Claims, 13 Drawing Sheets

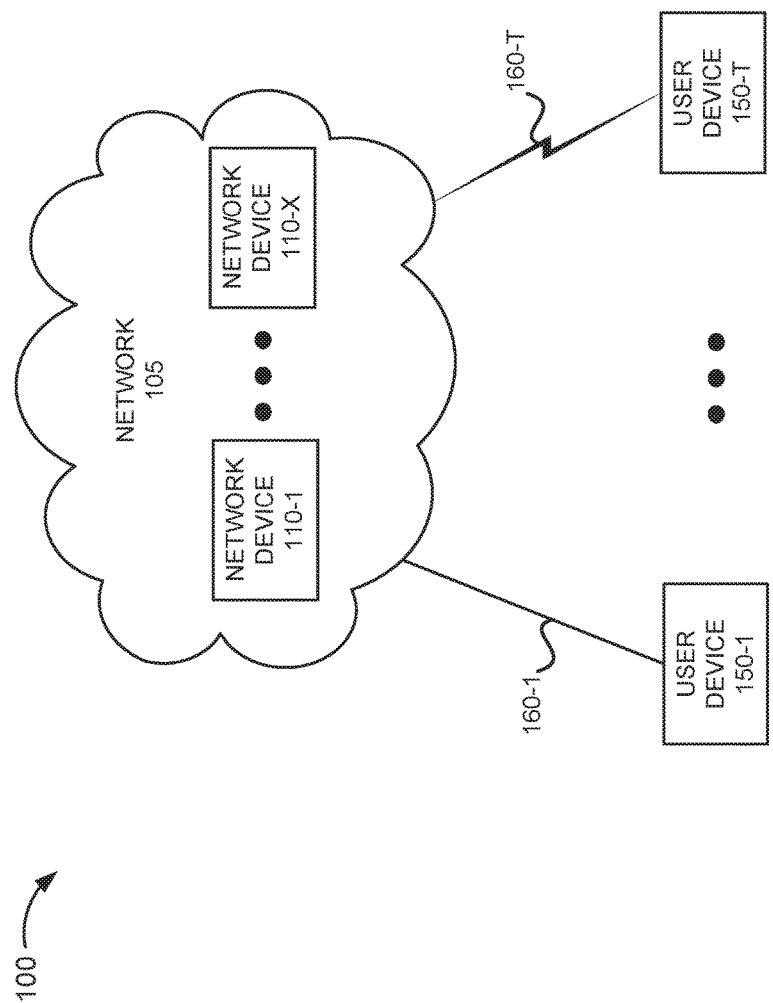

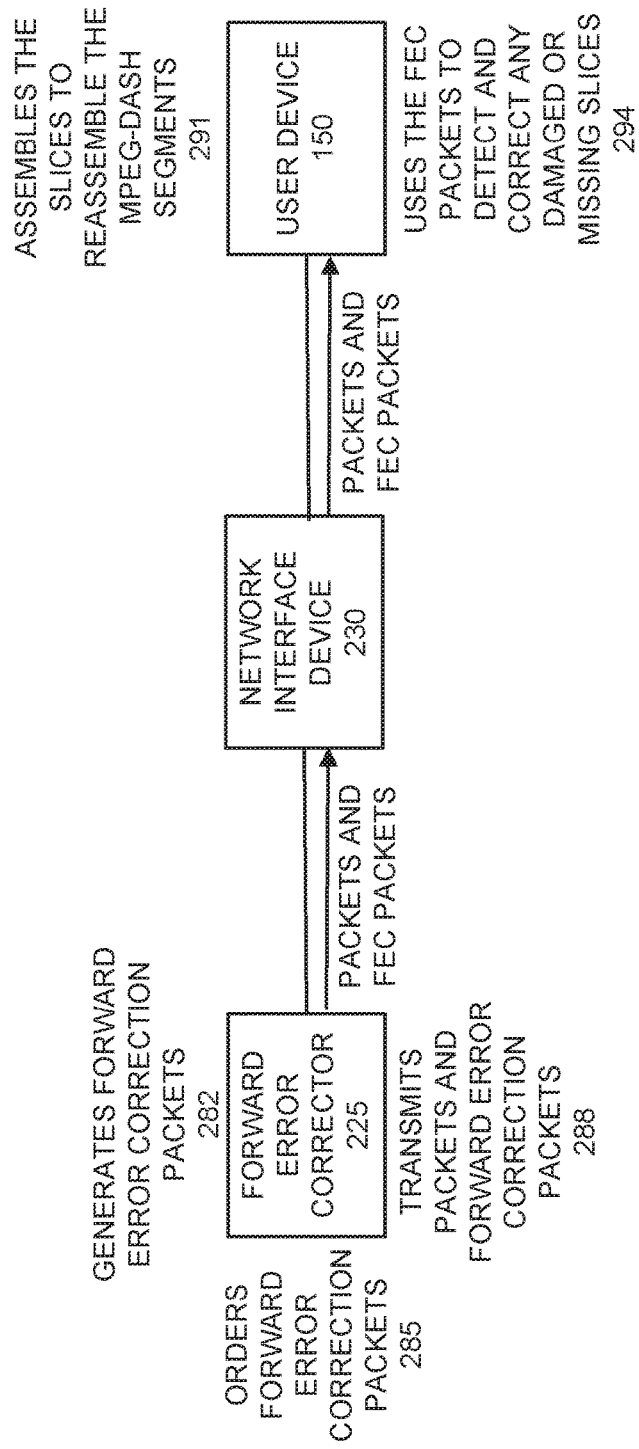

MPEG-DASH DELIVERY OVER MULTICAST

RELATED APPLICATION

This application claims priority under 35 U.S.C. § 119 based on U.S. Provisional Patent Application No. 62/417,469 filed Nov. 4, 2016, the disclosure of which is incorporated by reference herein in its entirety.

BACKGROUND

The Moving Picture Experts Group (MPEG) Dynamic Adaptive Streaming over Hypertext Transfer Protocol (HTTP) (MPEG-DASH) standard provides a set of HTTP adaptive bitrate streaming features, such as codec agnostic support, frame-synchronized adaptive bitrate switching, and support for multiple manifest formats for video-on-demand (VoD) and live streaming.

BRIEF DESCRIPTION OF THE DRAWINGS

FIG. 1A is a diagram illustrating an exemplary environment in which an exemplary embodiment of a multicast service for MPEG-DASH may be implemented;

FIGS. 2B-2F are diagrams illustrating an exemplary process of the multicast service provided by the network elements;

DETAILED DESCRIPTION OF PREFERRED EMBODIMENTS

Figure 1B:
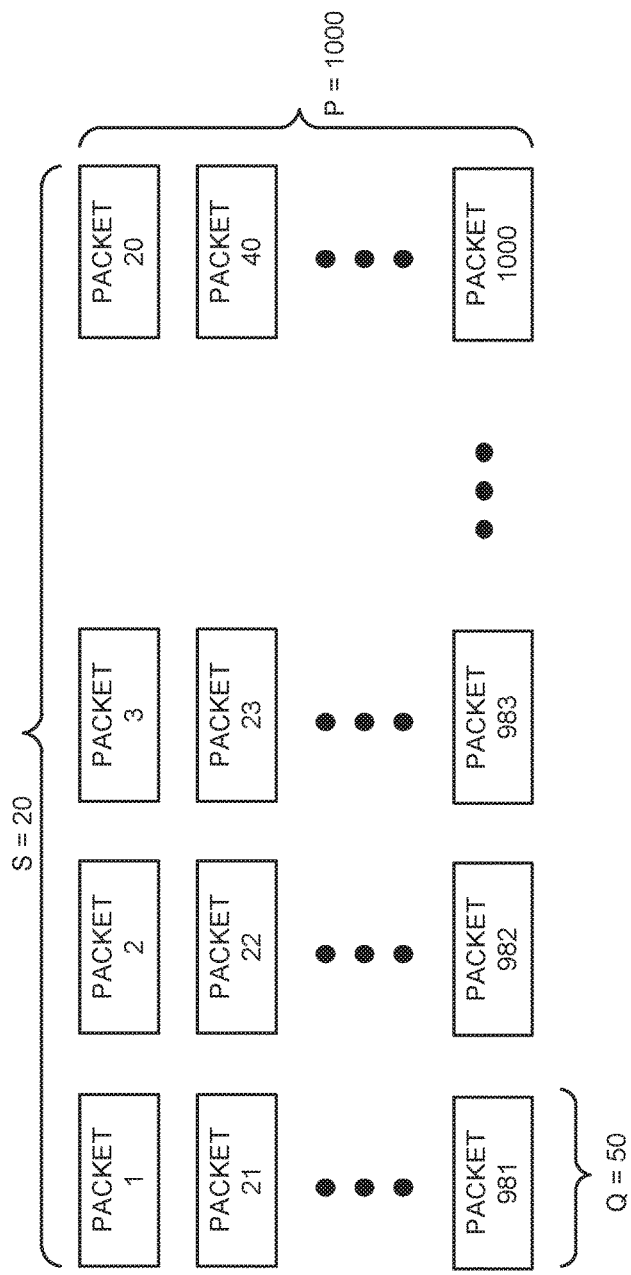
FIGS. 1B and 1C are diagrams pertaining to a forward error correction service included in the multicast service.

The following detailed description refers to the accompanying drawings. The same reference numbers in different drawings may identify the same or similar elements. Also, the following detailed description does not limit the invention.

MPEG-DASH is based on Media File Format standard International Organization for Standardization (ISO)/International Electromechanical Commission (IEC) 23009-1: 2014. Normally, MPEG-DASH uses HTTP because HTTP is stateless, firewall friendly, does not require a continuous connection with a streaming server, and can provide HTTP caching mechanisms.

The term "program" as used herein, is intended to include audio data and/or visual data. For example, the program may be implemented as television content, Internet content, user content, or other form of audio and/or video media. By way of further example, the program may be a movie, a television show, a sports event, video-on-demand (VoD) content, live content, pre-recorded content, premium channel content, pay-per-view content, a music event, a podcast, a videocast, a webcast, or a news event.

According to exemplary embodiments, a multicast service is provided. According to an exemplary embodiment, network elements of a network include logic that provides the multicast service. The multicast service may be implemented as a part of the preparation and multicast delivery of a program during a multicast to user devices.

According to an exemplary embodiment, the multicast service generates MPEG-DASH segments. The MPEG-DASH segments may include multiple adaptive bit rates of a program. According to an exemplary embodiment, the multicast service segments the MPEG-DASH segments into numerous slices in which a header is added to each slice. For example, a single MPEG-DASH segment may be divided into one thousand slices or other numerical division. By way of further example, the MPEG-DASH segment may correspond to a 2-second segment of the program, and each slice may correspond to a fraction of the time of the 2 seconds. According to an exemplary embodiment, each header includes sequence information. The header may be carried with slice in the payload of a protocol packet. In this regard, the header is a data instance that is separate and distinct from a header of a protocol packet (e.g., an Internet Protocol (IP) header, a User Datagram Protocol (UDP) header, etc.). For purposes of description, the term "packet" is used to refer to the slice and the header.

The packet may be loaded into another container for subsequent multicast transmission. According to an exemplary embodiment, the packets may be loaded into UDP packets, IP packets, or other type of packets of a protocol suitable for multicast transmission. This is in contrast to, for example, using protocol packets, such as Hypertext Transfer Protocol (HTTP), Transmission Control Protocol (TCP), etc., to transport program data, since these protocols are not suitable for multicast transmission. Depending on the byte size of each packet relative to the byte size of the protocol packet (e.g., payload size), the protocol packet may include one or multiple packets. According to an exemplary implementation, the byte size of the packet may be such that a UDP packet may carry at least one packet (e.g., a slice and a header) without the need for fragmentation. The multicast service transmits the packets downstream toward user devices of a multicast.

According to an exemplary embodiment, the multicast service receives the packets and rearranges any packets received out of order into a correct order. For example, the multicast service uses the sequence information included in the headers to determine the correct ordering of the slices and the packets including such slices. According to an exemplary embodiment, the multicast service identifies any missing slices of the MPEG-DASH segments and obtains the missing slices. For example, the multicast service uses the sequence information included in the headers to determine whether any slices are missing. According an exemplary implementation, the multicast service obtains the missing slice from a streaming device that is multicasting the program. The streaming device may transmit the missing slice via a unicast delivery method.

According to an exemplary embodiment, after the MPEG-DASH segments are reassembled and error detection and correction is performed, the MPEG-DASH segments are temporarily stored. The multicast service performs a forward error correction service on the MPEG-DASH segments, as described herein. According to an exemplary embodiment, the forward error correction service divides the packets into stripes or sub-groups of packets in which each sub-group includes packets that are not consecutively sequenced. For example, a stripe of packets may include packet #1, packet #11, etc., while another group may include packet #2, packet #12, and so forth. This is in contrast to a stripe of packets including packet #1, packet #2, packet #3, etc. According to an exemplary embodiment, a forward error correction service generates forward error correction (FEC) packets for each stripe. For purposes of description, the term "stripe" is used to describe a sub-group of packets.

According to an exemplary embodiment, after the forward error correction service is performed on the packets, the multicast service transmits the packets in order (e.g., packet #1, packet #2, etc.) followed by the forward error correction (FEC) packets (e.g., FEC packet #1, FEC packet #2, etc.). The packets (e.g., the program packets and the FEC packets) are delivered via a multicast protocol to user devices of the multicast.

FIG. 1A is a diagram illustrating an exemplary environment 100 in which an exemplary embodiment of a multicast service for MPEG-DASH may be implemented. As illustrated, environment 100 includes a network 105. Network 105 includes network devices 110-1 through 110-X, in which X>1 (also referred to as network devices 110 and, individually and generally as network device 110). Additionally, environment 100 includes user devices 150-1 through 150-T, in which T>1 (also referred to as user devices 150 and, individually and generally as user device 150). As further illustrated, environment 100 includes communication links 160-1 through 160-T, (also referred to collectively as links 160 and, individually and generally as link 160).

The number of network devices, the number of user devices, the number of networks, and the arrangement in environment 100 are exemplary. According to other embodiments, environment 100 may include additional network devices, fewer network devices, and/or differently arranged network devices, than those illustrated in FIG. 1A. Additionally, or alternatively, environment 100 may include additional networks, fewer networks, and/or arrangement that is/are different from that illustrated in FIG. 1A. For example, user device 150 may be a device of a local area network (LAN). Additionally, the number of links 160, the type of links 160 (e.g., wired, wireless, etc.), and the arrangement of links 160 illustrated in environment 100 are exemplary. For example, although not illustrated, links 160 exist between network devices 110 included in network 105.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

A communication connection between network devices 110 and between user device 150 and network device 110 may be direct or indirect via link 160. For example, an indirect communication connection may involve an intermediary network device, another user device, and/or an intermediary network not illustrated in FIG. 1A.

Network 105 includes one or multiple networks of one or multiple types. Network 105 may be implemented as a satellite-based network, a terrestrial-based network, or a combination thereof. Network 105 may be implemented to include a television distribution network, a mobile network, a program streaming network, or other suitable network (e.g., the Internet, etc.) for providing programs. Network 105 may be implemented to multicast programs using various technologies, such as an optical architecture, a coaxial cable architecture, an Internet Protocol (IP) TV architecture, a digital subscriber line (DSL) architecture, a wireless architecture, an Internet-based architecture, a program streaming architecture, or some combination thereof. Depending on the architecture implemented, network 105 may include super headend (SHE) devices, video hub office (VHO) devices, and video serving office (VSO) devices. Network 105 may include other types of devices, such as, for example, billing devices, security devices, customer profile devices, interactive programming guide devices, load balancer devices, and various types of program distribution devices (e.g., routers, gateway devices, repeater devices, splitter devices, passive optical network (PON) devices, etc.).

Network devices 110 include logic that prepares and delivers programs to user devices according to the multicast service described herein. According to an exemplary implementation, network devices 110 include logic that encodes a program, streams the program, reassembles the program, packages the program with forward error correction, and provides the program with forward error correction to user devices. According to an exemplary embodiment, network devices 110 include logic that further segments MPEG-DASH segments into numerous slices. According to an exemplary embodiment, network devices 110 include logic that generates a header for each slice. The header includes sequence information pertaining to the slice. According to an exemplary embodiment, network devices 110 include logic that places the packets in protocol packets that are suitable for multicast transmission. According to an exemplary implementation, the protocol packets are UDP packets. According to an exemplary embodiment, network devices 110 include logic that multicasts the protocol packets toward user devices 150.

According to an exemplary embodiment, network devices 110 include logic that divides the packets into stripes of packets in which each stripe includes packets that are not consecutively sequenced. For each stripe, network devices 110 include logic that generates forward error correction (FEC) packets. According to an exemplary embodiment, network devices 110 include logic that transmits the packets in sequence followed by the FEC packets to user devices 150 of the multicast.

According to an exemplary embodiment, network devices 110 include a mass storage device that stores programs. The programs may be stored in various resolutions, bitrates, compressions, encodings/decodings, frame rates, aspect ratios, languages, sample rates, and so forth. The programs may be played on various players of user devices 150 according to various player languages, formats, etc.

According to an exemplary embodiment, network devices 110 include an encoder device that includes logic that encodes the programs. According to an exemplary implementation, the encoder device includes logic that generates MPEG-DASH segments of the program. For example, the MPEG-DASH segments may include files having multiple adaptive bit rates of the program. According to an exemplary implementation, the encoder device includes logic that generates MPEG-DASH content. The MPEG-DASH content includes the Media Presentation Description (MPD), which describes a manifest of the available program, all of its various alternatives and the Uniform Resource Locator (URLs). In addition, there are the program segments, which contain the actual audio/video streams, chunked into playable segments (e.g., MPEG-DASH segments). To play the program, the DASH client first retrieves the MPD. By parsing the MPD, the DASH client learns about the program timing, program location (e.g., the URL), resolutions, minimum and maximum bandwidths, required digital rights management (DRM) and Forward Error Correction rules.

Using the MPD information, the DASH client selects the appropriate bit rate and starts streaming the program. The encoder device may be implemented as a network computer.

According to an exemplary embodiment, network devices 110 include a streaming device that includes logic to stream the program to user devices 150. According to an exemplary implementation, the streaming device includes logic to multicast the program. The streaming device may also include logic to broadcast and/or unicast the program. According to an exemplary implementation, the streaming device includes logic that divides the MPEG-DASH segment into multiple slices and adds a header to each slice. According to an exemplary implementation, the header includes sequence information (e.g., a sequence number) so that a correct ordering of the slices may be managed. The header may also include an identifier or sequence information pertaining to the MPEG-DASH segment to which the slice belongs. Also, the header may include an identifier of the program. In this regard, as previously described, the header is a data instance that is separate and distinct from a header of a protocol packet.

The streaming device includes logic that places the packets (e.g., the slices and the headers) in protocol packets that are suitable for multicast transmission. According to an exemplary implementation, the protocol packets are UDP packets. The streaming device also includes logic that generates the Multicast headers (e.g., UDP headers) for the protocol packets (e.g., UDP packets). The streaming device includes logic that streams protocol packets, which include the packets, towards user devices 150. The streaming device may be implemented as a network computer, a web server, an application server, a streaming server, an origin server, a media server, a video server, or other type of streaming server device.

According to an exemplary implementation, the encoder device or the streaming device may transmit packets with forward error correction and/or another type of communication-related service (e.g., encryption, etc.). However, the forward error correction is different than the forward error correction used by the forward error correction device, as described herein. For example, the forward error correction used by the encoder device or the streaming device may be based on a conventional or well-known forward error correction algorithm.

According to an exemplary embodiment, network devices 110 include a forward error correction device that includes logic to provide the forward correction service as described herein. According to an exemplary embodiment, the forward error correction device includes logic that receives the packets and assembles the slices of the MPEG-DASH segments in consecutive sequential order. According to an exemplary implementation, the forward error correction devices use the headers (e.g., the sequence numbers, etc.) associated with the slices to determine the correct ordering of the slices. According to an exemplary embodiment, the forward error correction device determines whether any slices of the MPEG-DASH segments are missing based on the header (e.g., sequence number, etc.) associated with each slice. The forward error correction device may perform error detection and correction in accordance with forward error correction used upstream. The assembled and error-free MPEG-DASH segments may be temporarily stored before the forward error correction service is performed.

The forward error correction device re-slices the MPEG-DASH segments and places them into packets. The forward error correction device uses the program data included in the packets to generate the FEC packets as described herein. For example, referring to FIG. 1B, assume that a group of 1000 packets (i.e., P=1000) are divided into 20 stripes (i.e., S=20) in which each stripe includes 50 packets (i.e., Q=50).

Figure 1C:
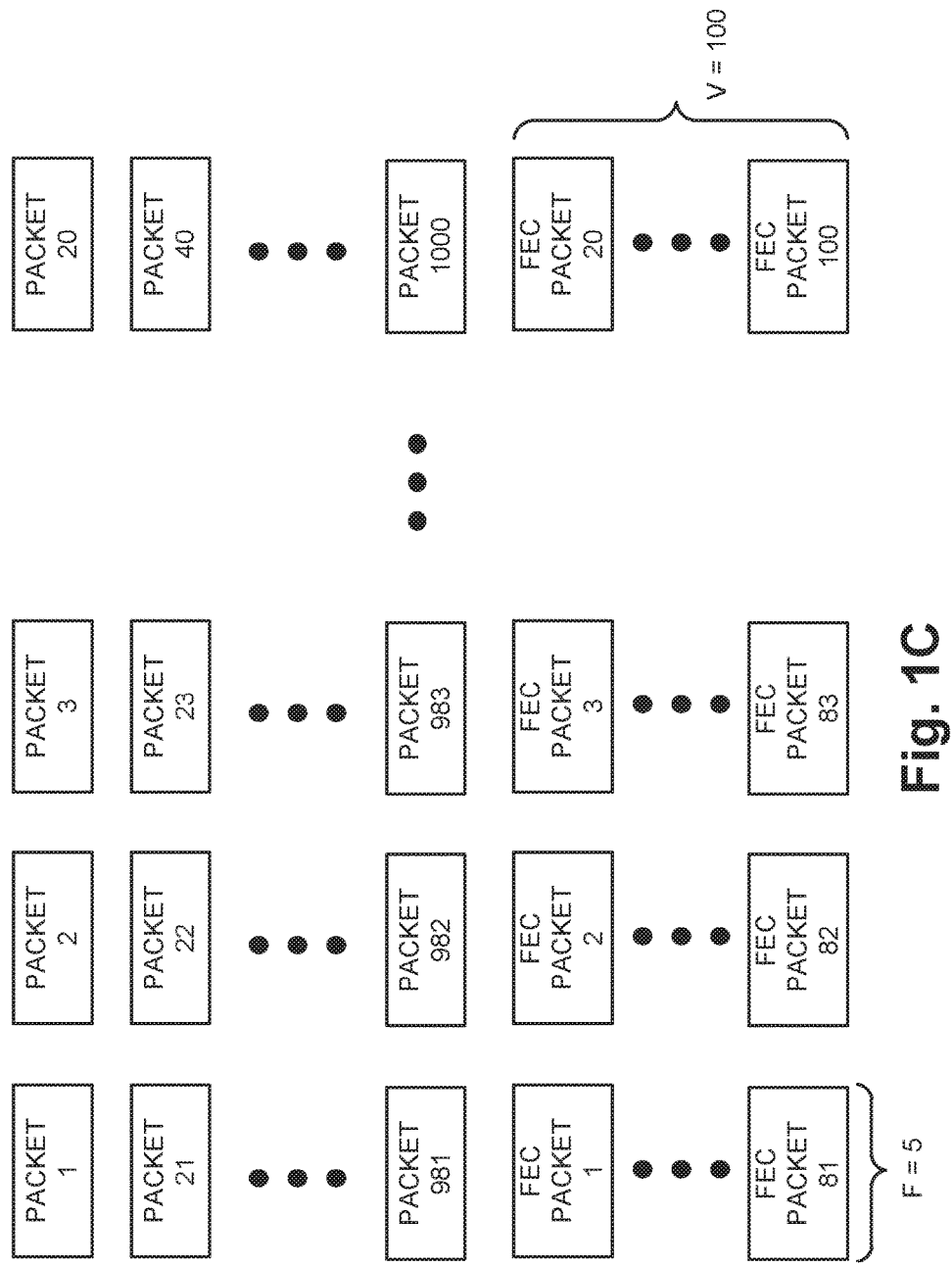

Referring to FIG. 1C, the forward error correction devices uses each stripe as a separate sub-group of packets to derive FEC packets. The forward error correction device may be configured with one or multiple parameters pertaining to the forward error correction service, such as the total number of FEC packets to generate and/or the number of FEC packets to generate for each stripe. In this example, the forward error correction device generates 100 FEC packets (i.e., V=100) in which each stripe includes 5 FEC packets (i.e., F=5). According to this example, the forward error correction packets provide a 10%/overhead (e.g., 100/1000) relative to the 1000 packets. Based on the forward error correction service, each stripe of packets (i.e., Q packets) can tolerate a loss of (F*S) consecutive packets (i.e., 100 consecutive packets).

The 5 FEC packets can recover up to 5 missing slices of its stripe. Additionally, each of the 5 FEC packets can recover any of the 50 packets included in the stripe. Additionally, for example, from the user device 150 perspective, when the number of FEC packets of a stripe is greater than the number of missing slices of the stripe, the forward error correction service may select any of the FEC packets belonging to the stripe so long as the number of FEC packets is equal to the number of missing slices. For example, when the stripe includes 3 missing slices, but the stripe includes 5 FEC packets, the forward error correction service at user device 150 may select any 3 of the available 5 FEC packets belonging to the stripe to recover the 3 missing slices. However, when the number of missing slices in the stripe exceeds the number of FEC packets in the stripe, the stripe may be unrecoverable. The MPEG-DASH segment may also be deemed unrecoverable.

The variables P, S, Q, V, and F and the values associated with these variables as explained in relation to FIGS. 1B and 1C are merely exemplary. According to other embodiments, the variables and/or the values may be different. Additionally, according to other implementations, additional, fewer, and/or different variables may be used. Additionally, or alternatively, according to various implementations, the value of the variable may be static or dynamic. By way of example, the value of the variable may dynamically change based on network state information (e.g., level of congestion, bit error rate, etc.).

The forward error correction device transmits the packets (e.g., packets 1-1000) and then the FEC packets (e.g., packets 1-100) toward user devices 150 of the multicast. The forward error correction device may be implemented as a packet forwarding device. For example, the packet forwarding device may be implemented as a repeater, a router, a gateway, or other type of network computational device.

User device 150 includes a communicative and computational device that can receive a multicast of a program from network devices 110. User device 150 may be implemented as a mobile device, a portable device, or a stationary device. For example, user device 150 may include a display device (e.g., a television, a smart television, a monitor), a set top box (e.g., a client device, a thin client device, a converter box, a receiver, a tuner, a digibox, an IPTV set top box), a server device (e.g., an in-home media server that includes tuners), a mobile device (e.g., a smartphone, a tablet device, a netbook, a phablet, a personal digital assistant, etc.), an in-vehicle infotainment system, a computer (e.g., a desktop computer, a laptop computer, etc.), or other type of end user device (e.g., a wearable device, an Internet access device, etc.). According to an exemplary embodiment, user device 150 includes a program player that is able to receive and play a program during a multicast session.

Communication link 160 provides a communication path between network 105 and user device 150, and between network device 110 and user device 150. Communication link 160 may have certain characteristics, such as, for example, bandwidth capacity and data rate. Communication link 160 may be implemented to include one or multiple mediums, such as wireless (e.g., radio, microwave, terrestrial, satellite, infrared, etc.) and/or wired (e.g., coaxial cable, optical fiber, copper, etc.).

FIGS. 2A-2F are diagrams illustrating an exemplary process of the multicast service. As illustrated, environment 200 includes a program storage 205, a program encoder 215, a program streamer 220, and a forward error corrector 225. These network elements may be implemented at network devices 110 of network 105 depicted in FIG. 1A. According to other exemplary embodiments, the multicast service may include additional, fewer, and/or different network elements than those illustrated in FIG. 2A and described herein. Additionally, or alternatively, multiple network elements may be combined into a single network element. For example, program encoder 215 and program streamer 220 may be combined into a single network element. Additionally, or alternatively, a single network element may be implemented as multiple network elements in which a process or a function may be collaboratively performed or multiple processes or functions may be split between them. For example, program encoder 215 may be implemented as multiple network elements, such as, for example, a segmenter that divides a program into segments or chunks, and a program presenter that generates a media presentation description (MPD).

As further illustrated, environment 200 includes a network interface device 230 and user device 150. For example, these end user elements may be implemented as customer premise devices. According to other exemplary implementations, additional, fewer, and/or different end user elements than those illustrated in FIG. 2A may be used. For example, network interface device 230 may be omitted. User device 150 is operated by a user 232.

Figure 2A:
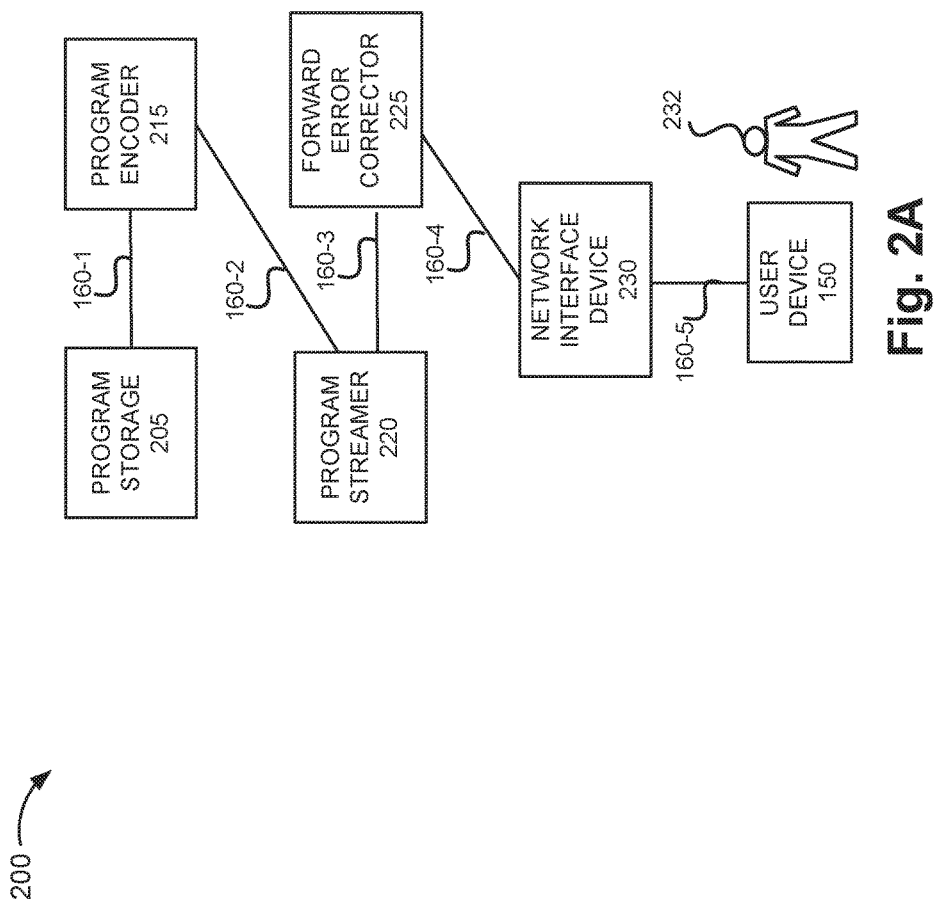
FIG. 2A is a diagram illustrating exemplary network elements that provide an exemplary embodiment of the multicast service.

Communication links 160 illustrated in FIG. 2A are exemplary. Communication link 160 between the network elements or between the network element and an end user element may be direct or indirect. For example, an indirect communication link 160 may include an intermediary device and/or intermediary network that is/are not illustrated in FIG. 2A.

Figure 2B:
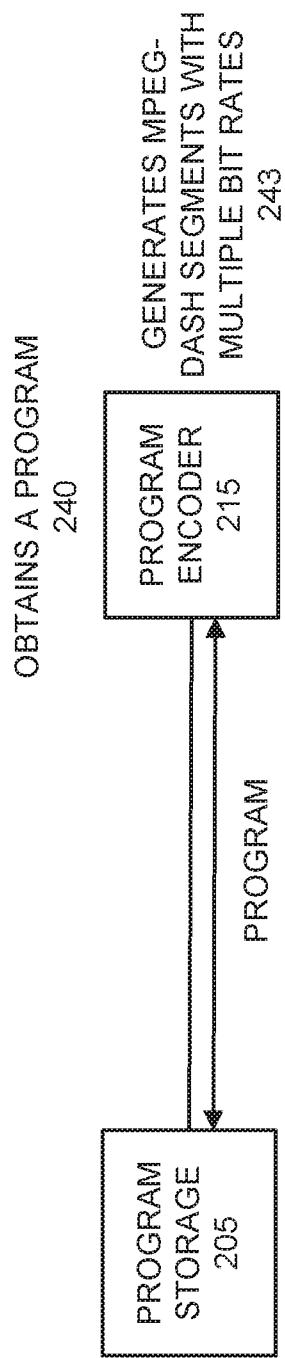

Referring to FIG. 2B, according to an exemplary scenario, assume that program storage 205 stores a program 251 that is to be multicasted. For example, assume that the program is a movie. Program encoder 215 obtains the program 240. For example, program encoder 215 may obtain the program via a push method or a pull method. The program may be the entire program or a portion of the program. In response to obtaining the program, program encoder 215 generates MPEG-DASH segments with multiple bit rates 243. For example, program encoder 215 may include logic that segments the program into transport stream (ts) files each of which has a particular duration (e.g., 2 seconds, 3 seconds, etc.) and a particular bitrate (e.g., 256,000 bits/second, 496,000 bits/second, etc.). Program encoder 215 may segment the program based on the maximum transmission unit supported by a multicast channel. Program encoder 215 may include logic that performs other transcoding operations based on various criteria, such as aspect ratio, language, compression, or other well-known factor.

Figure 2C:
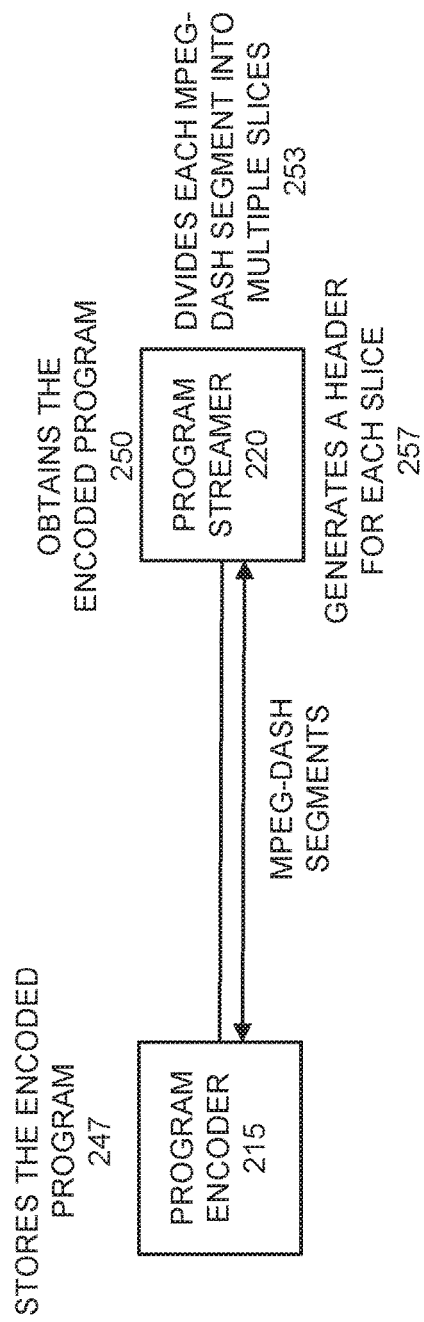

Referring to FIG. 2C, program encoder 215 stores the encoded program 247. Program streamer 220 obtains the encoded program 250 from program encoder 215. For example, program streamer 220 may obtain the MPEG-DASH segments 261 via a push method or a pull method. When a unicast protocol is used to transmit the MPEG-DASH segments (e.g., using HTTP) from encoder program 250, program streamer 220 may discard the protocol data (e.g., HTTP data) since program streamer 220 includes logic that streams the MPEG-DASH segments using a multicast protocol stack, as described herein. In response to receiving the MPEG-DASH segments, program streamer 220 includes logic that divides each of the MPEG-DASH segments into multiple slices 253.

Program streamer 220 also includes logic that generates a header for each slice 257. For example, the header includes sequence information (e.g., a sequence number or other type of indicator that represents placement in a consecutive sequence) so that a consecutive ordering of the slices can be determined. The header may also include other information pertaining to the program and/or the MPEG-DASH segment, as previously described. The header and the slice may be of a size that fits in a protocol packet (e.g., given a size associated with a maximum transmission unit of the protocol packet). According to an exemplary implementation, the protocol packet includes a UDP packet.

Program streamer 220 may include logic that adds forward error correction data to the protocol packets that are to be multicasted. In this way, when present, an intermediary device and/or an intermediary network (not illustrated) that resides between program streamer 220 and forward error corrector 225, may perform error detection and correction to the packets being multicasted before the packets are received by forward error corrector 225. Program streamer 220 includes logic that adds a Multicast header (e.g., a UDP Multicast header) to the protocol packet (e.g., the UDP packet).

Figure 2D:
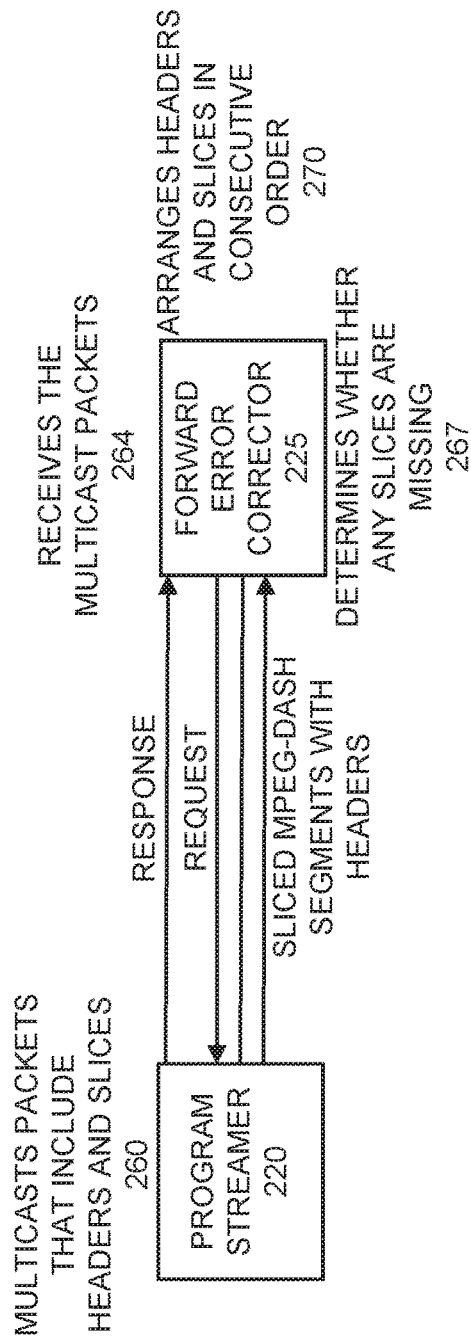

Referring to FIG. 2D, program streamer 220 includes logic that multicasts the packets that include the headers and the slices 260. Forward error corrector 225 receives the multicast packets 264. Forward error corrector 225 determines whether any slices are missing 267. For example, forward error corrector 225 may determine whether any slices are missing based on the sequence information included in the headers carried by the packets received. In the event that a slice is missing, forward error corrector 225 may generate a request to obtain the missing header and the missing slice, or the missing slice. The request may carry data indicating the missing header and the missing slice or, the missing slice. The request may also include other data (e.g., a program identifier of the program being multicasted, etc.).

As illustrated in FIG. 2D, according to an exemplary implementation, forward error corrector 225 transmits the request to program streamer 220. In response to receiving the request, program streamer 220 identifies the missing header and the missing slice, or the missing slice based on the data included in the request. Program streamer 220 generates a response that includes the missing header and the missing slice, or the missing slice. Program streamer 220 transmits the response to forward error corrector 225. For example, program streamer 220 may unicast the response to forward error corrector 225. When the response is received, forward error corrector 225 includes logic that stores the missing header and the missing slice.

Alternatively, for example, when only the missing slice is requested, forward error corrector 225 includes logic that generates the missing header, and stores the missing header and the missing slice. Forward error corrector 225 may then arrange the headers and the slices in consecutive order 270 and reassembles the MPEG-DASH segments. In the event that forward error corrector 225 determines that no slices are missing, forward error corrector 225 arranges the headers and the slices in consecutive order, as previously mentioned, and reassembles the MPEG-DASH segments.

Figure 2E:
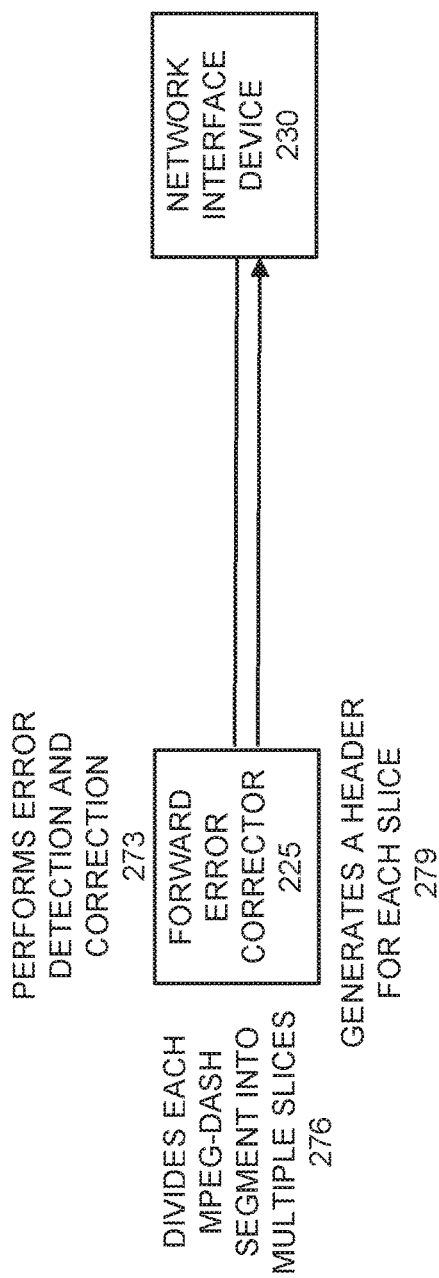

Referring to FIG. 2E, according to this example, forward error corrector 225 performs error detection and correction 273 on the assembled MPEG-DASH segments carried in the received packets. According to this example, assume that no errors or uncorrectable errors exist, and forward error corrector 225 stores the assembled MPEG-DASH segments in temporary storage (e.g., in a buffer, a cache, etc.). Forward error corrector 225 includes logic that divides each of the MPEG-DASH segments into multiple slices 276 and generates a header for each slice 279 in a manner previously described in relation to FIG. 2C, as performed by program encoder 215. Forward error corrector 225 includes logic that generates the packets based on the headers and the slices.

Referring to FIG. 2F, forward error corrector 225 uses the packets to generate forward error correction packets 282. According to an exemplary implementation, forward error corrector 225 selects a group of packets P that are consecutively and sequentially ordered. According to an exemplary implementation the value of P is an even number. Forward error corrector 225 divides the group of packets P into S sub-groups or stripes of packets. For example, referring to FIG. 1B, each stripe may include packets that are non-consecutive and equally spaced numerically by the value of S, where S=20 (e.g., packet 1, packet 21, packet 41, packet 61, in which packet 1 and packet 21 are spaced numerically by 20, etc.). Each stripe may or may not have the same number of packets. For example, while the value P may be implemented as an even number, when only an odd number of packets are available, one or multiple stripes may have a different number of packets relative to another stripe. Forward error corrector 225 uses each stripe to generate FEC packets pertaining to those packets included in the stripe. The number of FEC packets for each stripe may be the same or different depending on whether the number of packets in each stripe is the same or different. Also, the number of FEC packets generated for the group of packets P may be based on the amount of overhead that can be tolerated.

Referring back to FIG. 2F, forward error corrector 225 includes a forward error correction encoder that has logic to encode the packets included in each stripe. For example, the forward error correction encoder may use an error detection code (e.g., a parity check code, an arithmetic redundancy check (ARC) code, a cyclic redundancy check (CRC) code), a correction code (e.g., a block code, a convolution code), a concatenated error code, and/or other type of forward error control code. Forward error corrector 225 generates FEC packets for each stripe based on the code(s) and the program data included in the packets of the stripe.

Forward error corrector 225 may order or assign a sequence to the forward error correction packets 285. For example, referring to FIG. 1C, according to an exemplary implementation, a consecutive ordering of the FEC packets pertaining to the group of packets P is such that an FEC packet from each stripe is selected, in an order of the stripes, to form the consecutive sequential order (e.g., FEC packets 1-20). This process may repeat depending on the number of FEC packets generated (e.g., FEC packets 21-40, etc.).

In response to the generation and the ordering of the FEC packets, forward error corrector 225 places the packets and the FEC packets in protocol packets, and transmits (e.g., multicasts) the packets, which include the headers and the slices, followed by the FEC packets to user device 150 via network interface device 230, as a part of the multicast session. According to this example, assume that network interface device 230 is implemented as a customer premise device, such as a wireless router of a local area network (LAN) at a location of user 232. Also, according to this example, assume that user device 150 is implemented as a set top box. According to such an example, there may be an intermediary device and/or an intermediary network between forward error corrector 225 and network interface device 230 that is not illustrated for purposes of brevity. Nevertheless, upon receipt of the packets and the FEC packets, network interface device 230 transmits the packets and the FEC packets to user device 150. Network interface device 230 and user device 150 may use a multicast protocol. For example, these devices may use a light version of the Pragmatic General Multicast (PGM) Protocol so that the packets and the FEC packets are protected over the link established between network interface device 230 and user device 150.

In response to receiving the packets and the FEC packets, user device 150 includes logic of a forward error correction service that reassembles the MPEG-DASH segments 291, and uses the forward error correction packets to detect and correct any damaged or missing slices 294.

Figure 3:
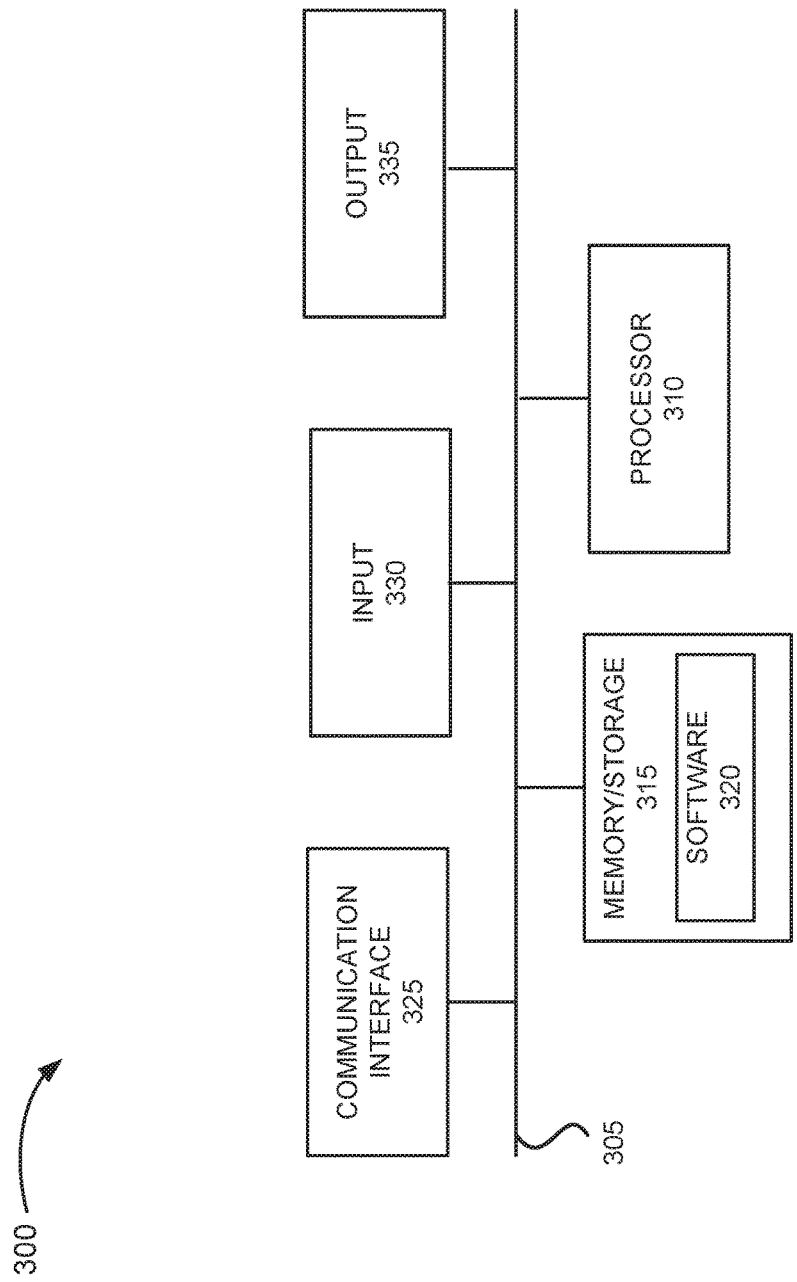
FIG. 3 is a diagram illustrating exemplary components of a device that may correspond to network devices and a user device depicted in the environment of FIG. 1A.

FIG. 3 is a diagram illustrating exemplary components of a device 300 that may correspond to one or more of the devices described herein. For example, device 300 may correspond to components included in network device 110, user device 150, and network interface device 230. Additionally, the exemplary network elements (e.g., program storage 205, program encoder 215, program streamer 220, and forward error corrector 225) may be implemented based on the components described. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other form of instruction. By way of example, with respect to network devices 110 and the network elements, the logic that provides the multicast service may be implemented to include software 320. Additionally, for example, user device 150 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
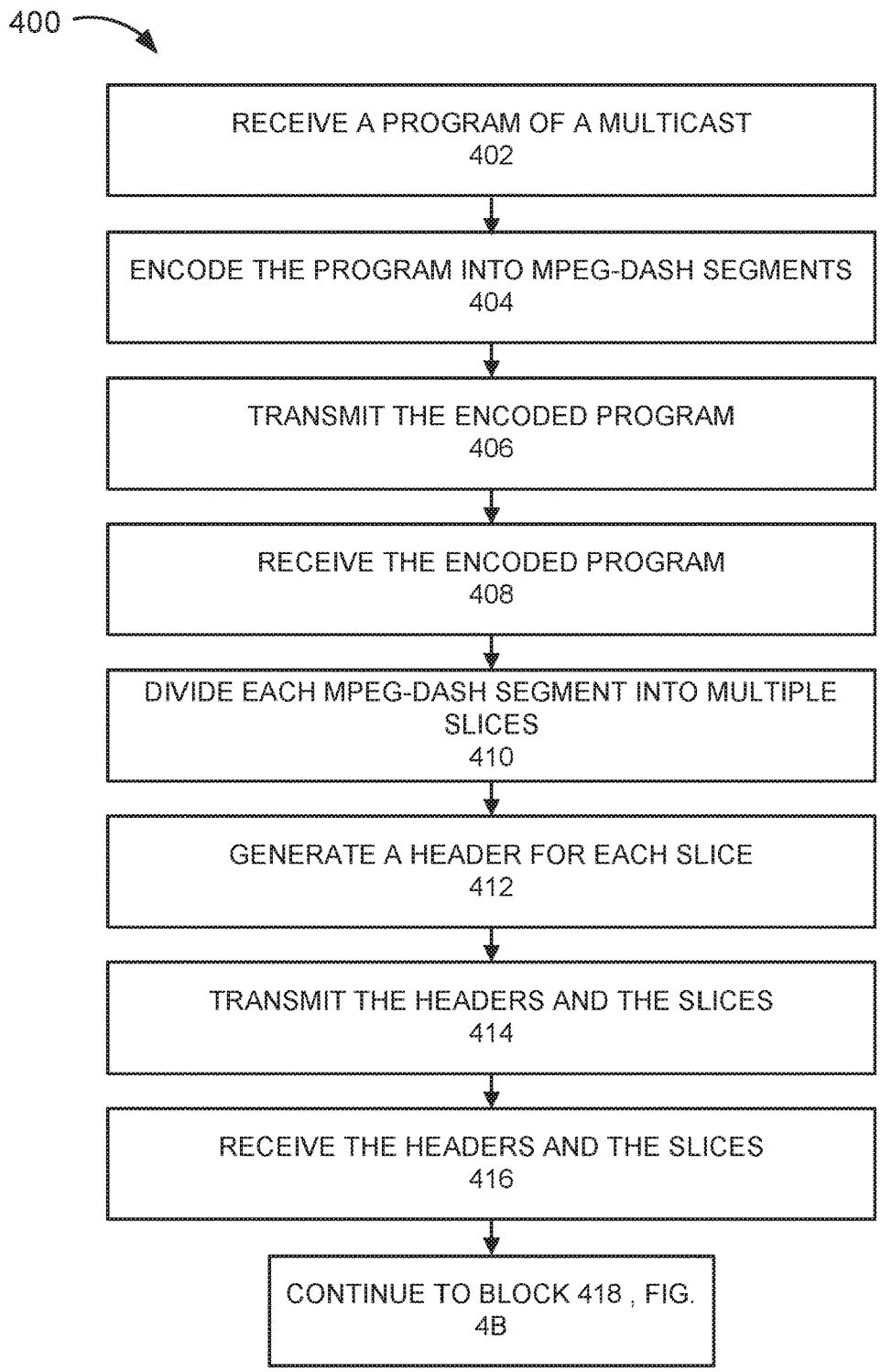
FIGS. 4A and 4B are flow diagrams illustrating an exemplary process of the multicast service.
Figure 4B:
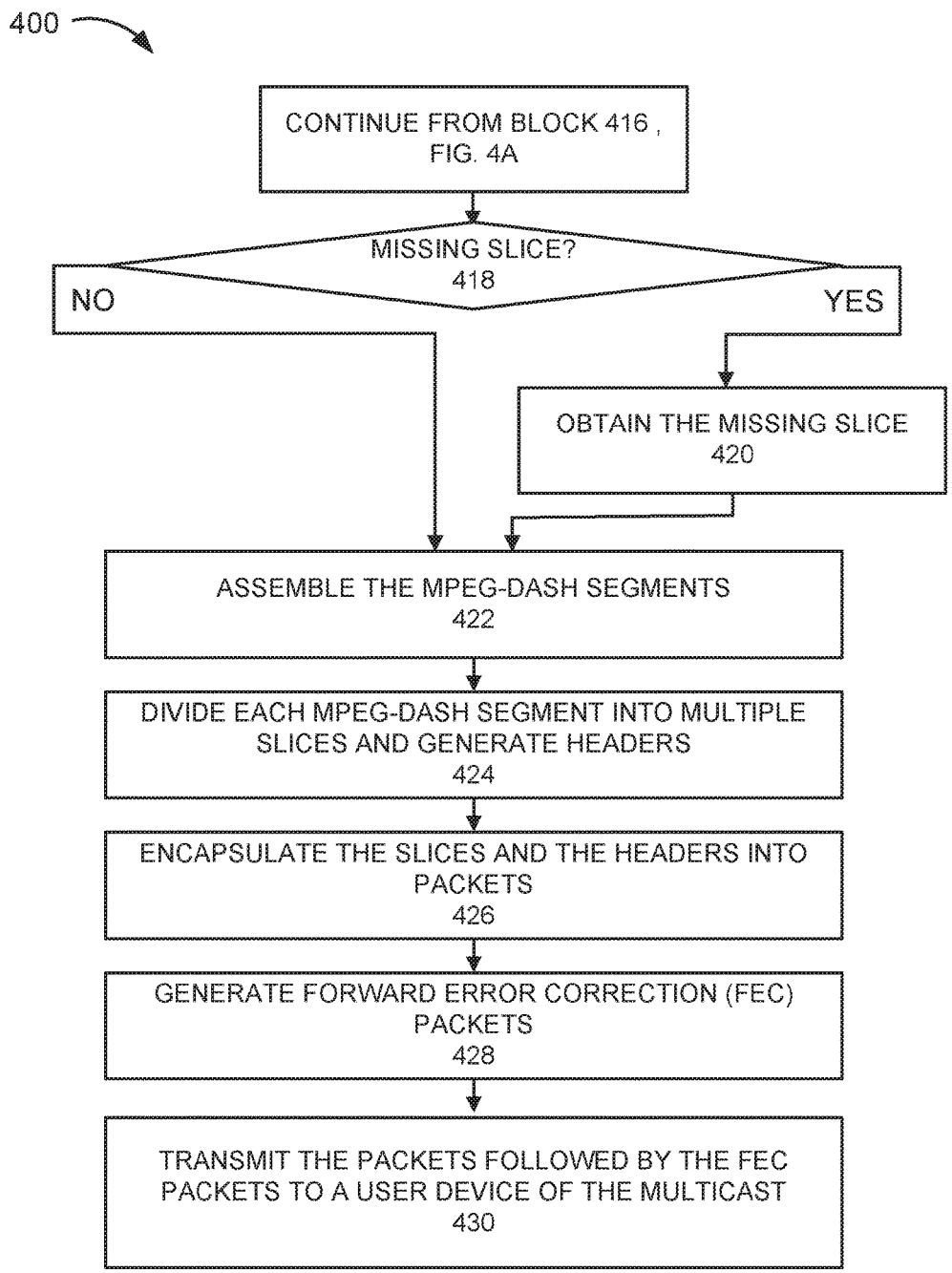

FIGS. 4A and 4B are flow diagrams illustrating an exemplary process 400 pertaining to the multicast service. Process 400 is directed to processes previously described with respect to FIGS. 2A-2F and elsewhere in this detailed description pertaining to the multicast service. According to an exemplary embodiment, program encoder 215, program streamer, and forward error corrector 225 perform the steps of process 400. For example, processor 310 executes software 320 to perform the steps described.

Referring to FIG. 4A, in block 405, process 400 may begin with receiving a program of a multicast. For example, program encoder 215 may receive a program from program storage 205. The program may be designated for delivery as a multicast program.

In block 404, the program is encoded into MPEG-DASH segments. For example, program encoder 215 generates MPEG-DASH segments with multiple bit rates. By way of further example, program encoder 215 may segment the program into transport stream files each of which has a particular duration and bitrate. In block 406, the encoded program is transmitted. For example, in response to the segmentation, program encoder 215 transmits packets, which include the MPEG-DASH segments, to program streamer 220.

In block 408, the encoded program is received. For example, program streamer 220 receives the MPEG-DASH segments from program encoder 215. In block 410, each MPEG-DASH segment is divided into multiple slices. For example, program streamer 220 divides each MPEG-DASH segment into smaller segments of program data (e.g., slices). In block 412, a header for each slice is generated. For example, program streamer 220 generates a header for each slice in which each header includes sequence information that indicates an ordering of the slices.

In block 414, the headers and the slices are transmitted. For example, program streamer 220 multicasts packets, which include the headers and the slices, to forward error corrector 225. In block 416, the headers and the slices are received. For example, forward error corrector 225 receives the packets that include the headers and the slices. Referring to FIG. 4B, in block 418, it is determined whether there is a missing slice. For example, forward error corrector 225 may determine whether any slices are missing based on the sequence information included in the headers carried by the packets received.

When it is determined that there is a missing slice (block 418—YES), the missing slice is obtained (block 420). For example, forward error corrector 225 may obtain the missing slice from program streamer 220. By way of example, as previously described, forward error corrector 225 may transmit a request to program streamer 220. The request may include data indicating the missing header and slice and a program identifier pertaining to the program being multicasted. In response, program streamer 220 obtains the missing header and the missing slice (e.g., retrieves from storage) and retransmits the header and the missing slice to forward error corrector 225. Process 400 may continue to block 422.

When it is determined that there is not a missing slice (block 418-NO), the MPEG-DASH segments are assembled (block 422). For example, forward error corrector 225 assembles the MPEG-DASH segments into a consecutive sequential order. Additionally, for example, forward error detection and correction may be performed on the assembled MPEG-DASH segments.

In block 424, each MPEG-DASH segment is divided into multiple slices and a header for each slice is generated. For example, forward error corrector 225 divides each MPEG-DASH segment into smaller segments of program data (e.g., slices). Also, for example, forward error corrector 225 generates a header for each slice in which each header includes sequence information that indicates an ordering of the slices. In block 426, the slices and the headers are encapsulated into packets.

In block 428, forward error correction packets are generated pertaining to the packets. For example, forward error corrector 225 generates forward error correction packets according to an exemplary implementation of the forward error correction service described herein. In block 430, the packets and the forward error correction packets are transmitted to a user device of the multicast. For example, forward error corrector 225 multicasts the packets and the forward error correction packets to user devices 150 that are to receive the multicast.

Although FIGS. 4A and 4B illustrate an exemplary process of a multicast system, according to other embodiments, process 400 may include additional operations, fewer operations, and/or different operations than those illustrated in FIGS. 4A and 4B, and as described herein.

Figure 5:
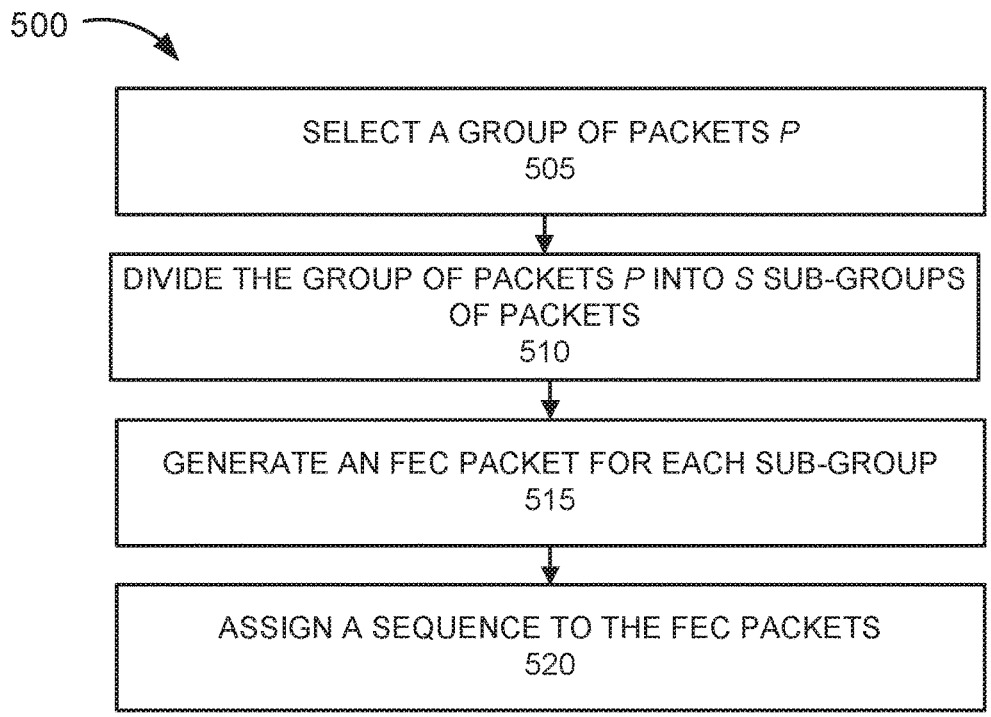
FIG. 5 is a flow diagram illustrating an exemplary process of a forward error correction service included in the multicast service.

FIG. 5 is a flow diagram illustrating another exemplary process 500 pertaining to the multicast service. Process 500 is directed to a process previously described with respect to FIGS. 1B, 1C, and 2E as well as elsewhere in this detailed description. According to an exemplary embodiment, forward error corrector 225 performs the steps of process 500. For example, processor 310 executes software 320 to perform the steps described. Process 500 may be implemented at block 428 of FIG. 4B.

Referring to process 500, in block 505, a group of packets P is selected. For example, packets that include the headers and the slices pertaining to the MPEG-DASH segments of a program are selected. Additionally, as previously described, the group of packets P is a consecutively and sequentially ordered set of packets. According to an exemplary implementation, the value of P is an even number.

In block 510, the group of packets P is divided into S sub-group of packets. For example, each stripe may include packets that are not consecutive and sequential. By way of further example, each packet of within sub-group may be equally spaced apart numerically, in terms of sequence, by the value of S, which forms a new sequence of packets that are not (immediately) consecutive. Each stripe may or may not have the same number of packets.

In block 515, a forward error correction packet is generated for each sub-group of packets. For example, the forward error correction encoder may use an error detection code (e.g., a parity check code, an ARC code, a CRC code), a correction code (e.g., a block code, a convolution code), a concatenated error code (e.g., Reed-Solomon/Viterbi algorithm), and/or other type of forward error control code. Forward error corrector 225 generates forward error packets for each stripe based on the code(s) and the program data included in the packets of the stripe.

In block 520, a sequence to the forward error correction packets is assigned. For example, according to an exemplary implementation, the sequence of the forward error correction packets is such that a forward error correction packet from each stripe is selected, in an order of the stripes, to form a consecutive sequential order (e.g., FEC packets 1-20). This process may repeat depending on the number of forward error correction packets generated (e.g., FEC packets 21-40, etc.).

Although FIG. 5 illustrates an exemplary process pertaining to the multicast system, according to other embodiments, process 500 may include additional operations, fewer operations, and/or different operations than those illustrated in FIG. 5, and as described herein.

The foregoing description of embodiments provides illustration, but is not intended to be exhaustive or to limit the embodiments to the precise form disclosed. Accordingly, modifications to the embodiments described herein may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while series of blocks have been described with regard to the processes illustrated in FIGS. 4A, 4B, and 5, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310), or a combination of hardware and software (e.g., software 320). The embodiments have been described without reference to the specific software code since the software code can be designed to implement the embodiments based on the description herein and commercially available software design environments/languages.

In the description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the description or illustrated in the drawings should be construed as critical or essential to the embodiments described herein unless explicitly described as such.

What is claimed is:

1. A method comprising:
   receiving, by a first network device of a multicast network, a program including audio and video data;
   generating, by the first network device, Moving Picture Experts Group (MPEG) Dynamic Adaptive Streaming over Hypertext Transfer Protocol (HTTP) (MPEG-DASH) segments that have multiple bit rates in response to the receiving;
   transmitting, by the first network device and to a second network device of the multicast network, first packets that include the MPEG-DASH segments in response to the generating;
   dividing, by the second network device, each of the MPEG-DASH segments into first multiple slices of program data, wherein the program data includes a portion of the audio and video data;
   generating, by the second network device, a first header for each first slice of the first multiple slices, wherein the first header includes sequence information;
   multicasting, by the second network device and to a third network device of the multicast network, second packets that include first headers and the first multiple slices of each of the MPEG-DASH segments;
   assembling, by the third network device, the MPEG-DASH segments based on the first headers and the first multiple slices;
   dividing, by the third network device, each of the MPEG-DASH segments into second multiple slices of the program data;
   encapsulating, by the third network device, the second multiple slices of the program data into third packets;
   generating, by the third network device, forward error correction packets pertaining to the third packets, wherein the generating of the forward error correction packets pertaining to the third packets comprises:
   selecting, by the third network device, P packets from the third packets, wherein P is a numerical value and the P packets are consecutively and sequentially ordered based on the second multiple slices of the program data;
   dividing, by the third network device, the P packets into S sub-groups of packets, wherein S is a numerical value, and wherein each sub-group includes a sub-group of packets of the P packets and the sub-group of packets are not consecutively and sequentially ordered; and
   generating, by third network device, a sub-group of forward error correction packets for each sub-group based on the sub-group of packets within each sub-group of S sub-groups; and
   multicasting, by the third network device and to a user device of a multicast, the third packets and the forward error correction packets.

2. The method of claim 1, wherein at least one of P or S is dynamic in value based on network state information of the multicast network.

3. The method of claim 1, wherein the sub-group of packets within each sub-group of S sub-groups are sequenced based on the value of S.

4. The method of claim 1, further comprising:
   generating, by the second network device, forward error correction data, and wherein the multicasting of the second packets comprises:
   multicasting, by the second network device and to the third network device, the second packets with the forward error correction data.

5. The method of claim 1, further comprising:
   generating, by the third network device, a second header for each slice of the second multiple slices, wherein the second header includes sequence information, and wherein the multicasting of the third packets comprises:
   multicasting, by the third network device and to the user device of the multicast, the third packets and the forward error correction packets.

6. The method of claim 1, further comprising:
   receiving, by the third network device and from the second network device, the second packets;
   determining, by the third network device and in response to the receiving of the second packets, whether there is a header and a slice of the first headers and the first slices missing in the second packets; and
   obtaining, by the third network device and in response to determining, the header and the slice.

7. The method of claim 6, further comprising:
   generating, by the third network device, a request for the header and the slice, wherein the request includes an identifier indicating the header and the slice, and a program identifier of the program;
   transmitting, by the third network device and to the second network device, the request; and
   receiving, by the third network device and from the second network device, a response to the request that includes the header and the slice.

8. The method of claim 1, wherein the second network device includes a server that streams the program to the user device when multicasting.

9. A multicast system comprising:
   a first network device of a multicast network comprising:
   a first communication interface comprising a first transmitter and a first receiver;
   a first memory, wherein the first memory stores first software; and a first processor, wherein the first processor executes
the first software to:
receive a program including audio and video data;
generate Moving Picture Experts Group (MPEG)
Dynamic Adaptive Streaming over Hypertext
Transfer Protocol (HTTP) (MPEG-DASH) segments that have multiple bit rates in response to
the receipt of the program;
transmit, via the first communication interface and to
a second network device of the multicast network,
first packets that include the MPEG-DASH segments in response to the generation;
the second network device comprising:
a second communication interface comprising a second
transmitter and a second receiver;
a second memory, wherein the second memory stores
second software; and
a second processor, wherein the second processor
executes the second software to:
divide each of the MPEG-DASH segments into first
multiple slices of program data, wherein the program data includes a portion of the audio and
video data;
generate a first header for each first slice of the first
multiple slices, wherein the first header includes
sequence information;
multicast, via the second communication interface
and to a third network device of the multicast
network, second packets that include first headers
and the first multiple slices of each of the MPEG-DASH segments;
the third network device comprising:
a third communication interface comprising a third
transmitter and a third receiver;
a third memory, wherein the third memory stores third
software; and
a third processor, wherein the third processor executes
the third software to:
assemble the MPEG-DASH segments based on the
first headers and the first multiple slices;
divide each of the MPEG-DASH segments into
second multiple slices of the program data;
encapsulate the second multiple slices of the program data into third packets;
generate forward error correction packets pertaining
to the third packets, wherein the generation of the
forward error correction packets pertaining to the
third packets includes to:
select P packets from the third packets, wherein P
is a numerical value and the P packets are
consecutively and sequentially ordered based
on the second multiple slices of the program
data;
divide the P packets into S sub-groups of packets,
wherein S is a numerical value, and wherein
each sub-group includes a sub-group of packets
of the P packets and the sub-group of packets
are not consecutively and sequentially ordered;
and
generate a sub-group of forward error correction
packets for each sub-group based on the sub-group of packets within each sub-group of S
sub-groups; and
multicast, via the third communication interface and
to a user device of a multicast, the third packets
and the forward error correction packets.

10. The multicast system of claim 9,
wherein at least one of P or S is dynamic in value based
on network state information of the multicast network.

11. The multicast system of claim 9, wherein the sub-group of packets within each sub-group of S sub-groups are
sequenced based on the value of S.

12. The multicast system of claim 9, wherein the second
processor further executes the second software to:
generate forward error correction data, and wherein when
multicasting the second packets, the second processor
further executes the second software to:
multicast, via the second communication interface and to
the third network device, the second packets with the
forward error correction data.

13. The multicast system of claim 9, wherein the third
processor further executes the third software to:
generate a second header for each slice of the second
multiple slices, wherein the second header includes
sequence information, and wherein when multicasting
the third packets, the third processor further executes
the third software to:
multicast, via the third communication interface and to
the user device of the multicast, the third packets and
the forward error correction packets.

14. The multicast system of claim 9, wherein the third
processor further executes the third software to:
receive, via the third communication interface and from
the second network device, the second packets;
determine, in response to the receipt of the second packets, whether there is a header and a slice of the first
headers and the first slices missing in the second
packets; and
obtain, via the third communication interface and in
response to a determination that the header and the slice
are missing, the header and the slice.

15. The multicast system of claim 9, wherein the second
network device includes a server that streams the program,
and the third network device includes a repeater.

16. A non-transitory computer-readable storage medium
that stores instructions executable by a processor of a
computational device, which when executed cause the computational device to:
receive a program including audio and video data;
generate Moving Picture Experts Group (MPEG)
Dynamic Adaptive Streaming over Hypertext Transfer
Protocol (HTTP) (MPEG-DASH) segments that have
multiple bit rates in response to the receipt of the
program;
transmit first packets that include the MPEG-DASH segments in response to the generation;
divide each of the MPEG-DASH segments into first
multiple slices of program data, wherein the program
data includes a portion of the audio and video data;
generate a first header for each first slice of the first
multiple slices, wherein the first header includes
sequence information;
multicast second packets that include first headers and the
first multiple slices of each of the MPEG-DASH segments;
assemble the MPEG-DASH segments based on the first
headers and the first multiple slices;
divide each of the MPEG-DASH segments into second
multiple slices of the program data;
encapsulate the second multiple slices of the program data
into third packets;

generate forward error correction packets pertaining to the third packets, wherein the generation of the forward error correction packets pertaining to the third packets includes to:
- select P packets from the third packets, wherein P is a numerical value and the P packets are consecutively and sequentially ordered based on the second multiple slices of the program data;
- divide the P packets into S sub-groups of packets, wherein S is a numerical value, and wherein each sub-group includes a sub-group of packets of the P packets and the sub-group of packets are not consecutively and sequentially ordered; and
- generate a sub-group of forward error correction packets for each sub-group based on the sub-group of packets within each sub-group of S sub-groups; and multicast to a user device of a multicast, the third packets and the forward error correction packets.

17. The non-transitory, computer-readable storage medium of claim 16,
wherein at least one of P or S is dynamic in value based on network state information of the multicast network.

18. The non-transitory, computer-readable storage medium of claim 16, wherein the sub-group of packets within each sub-group of S sub-groups are sequenced based on the value of S.

19. The non-transitory, computer-readable storage medium of claim 16, wherein the instructions to provide further comprise instructions to:
generate forward error correction data, and wherein the instructions to multicast the second packets, the instructions further comprise instructions to:
multicast the second packets with the forward error correction data.

20. The non-transitory, computer-readable storage medium of claim 16, wherein the instructions further comprise instructions to:
- receive the second packets;
- determine, in response to the receipt of the second packets, whether there is a header and a slice of the first headers and the first slices missing in the second packets; and
- obtain, in response to a determination that the header and the slice are missing, the header and the slice.

* * * * *